(12) United States Patent
Ruccella et al.

(10) Patent No.: US 11,143,577 B2
(45) Date of Patent: Oct. 12, 2021

(54) PORTABLE AIR SAMPLING APPARATUS AND AIR SAMPLING INSTALLATION COMPRISING SUCH AN APPARATUS

(71) Applicant: CYNO-DEV, Vittel (FR)

(72) Inventors: Joseph Ruccella, Vittel (FR); Michael Dahan, Gagny (FR)

(73) Assignee: CYNO-DEV, Vittel (FR)

( * ) Notice: Subject to any disclaimer, the term of this patent is extended or adjusted under 35 U.S.C. 154(b) by 163 days.

(21) Appl. No.: 16/429,421

(22) Filed: Jun. 3, 2019

(65) Prior Publication Data

US 2019/0368981 A1    Dec. 5, 2019

(30) Foreign Application Priority Data

Jun. 4, 2018 (FR) ...................................... 1854816

(51) Int. Cl.
| | |
|---|---|
| *G01N 1/24* | (2006.01) |
| *G01N 1/14* | (2006.01) |
| *G01N 1/22* | (2006.01) |

(52) U.S. Cl.
CPC ................ *G01N 1/24* (2013.01); *G01N 1/14* (2013.01); *G01N 1/2273* (2013.01);
(Continued)

(58) Field of Classification Search
CPC .......... G01N 1/24; G01N 1/14; G01N 1/2273; G01N 2001/1427; G01N 2001/2276;
(Continued)

(56) References Cited

U.S. PATENT DOCUMENTS

| | | | |
|---|---|---|---|
| 2,947,166 A | 8/1960 | Palmer et al. | |
| 5,337,595 A * | 8/1994 | Lewis ................... | G01N 1/2252 73/23.31 |

(Continued)

FOREIGN PATENT DOCUMENTS

| | | |
|---|---|---|
| CN | 205182472 U | 4/2016 |
| FR | 2956211 A1 | 8/2011 |
| GB | 703079 A | 1/1954 |

OTHER PUBLICATIONS

FR Search Report, dated Apr. 18, 2019, from corresponding FR application No. 1854816.

*Primary Examiner* — Robert R Raevis
(74) *Attorney, Agent, or Firm* — Nixon & Vanderhye

(57) ABSTRACT

This portable air sampling apparatus includes a Venturi pump creating a vacuum in a suction inlet when compressed air circulates therein; a supply line supplying the Venturi pump with compressed air, including an electrovalve that controls circulation of compressed air in the supply line; a suction line to suction an air sample, having an air circulation member delimiting a chamber for removably receiving a substrate for capturing odorous molecules and suitable for circulating the suctioned air sample through the substrate; and an electronic unit, connected to the electrovalve, controlling its opening and closing so when the electrovalve is opened, compressed air circulates in the supply line through the electrovalve, while when the electrovalve is closed, compressed air circulation in the supply line, between upstream and downstream of the electrovalve, is interrupted by the electrovalve. This enables performing reliable inspections, while being practical and easy to use.

16 Claims, 2 Drawing Sheets

(52) U.S. Cl.
CPC ............... *G01N 2001/1427* (2013.01); *G01N 2001/2276* (2013.01); *G01N 2001/242* (2013.01)

(58) Field of Classification Search
CPC ........... G01N 2001/242; G01N 1/2214; G01N 2001/2273; G01N 2001/2297
USPC ......... 73/23.34, 31.01, 31.02, 865.7, 863.01, 73/863.02, 863.21, 863.23, 73/863.71–863.73, 864, 864.34
See application file for complete search history.

(56) References Cited

U.S. PATENT DOCUMENTS

| | | | |
|---|---|---|---|
| 6,029,506 A | 2/2000 | Dilger | |
| 2008/0087110 A1 | 4/2008 | Montefusco | |
| 2011/0315229 A1* | 12/2011 | Linder | ................ G01N 33/543 137/1 |
| 2016/0118149 A1* | 4/2016 | Hill | ........................ G21C 9/004 376/256 |

\* cited by examiner

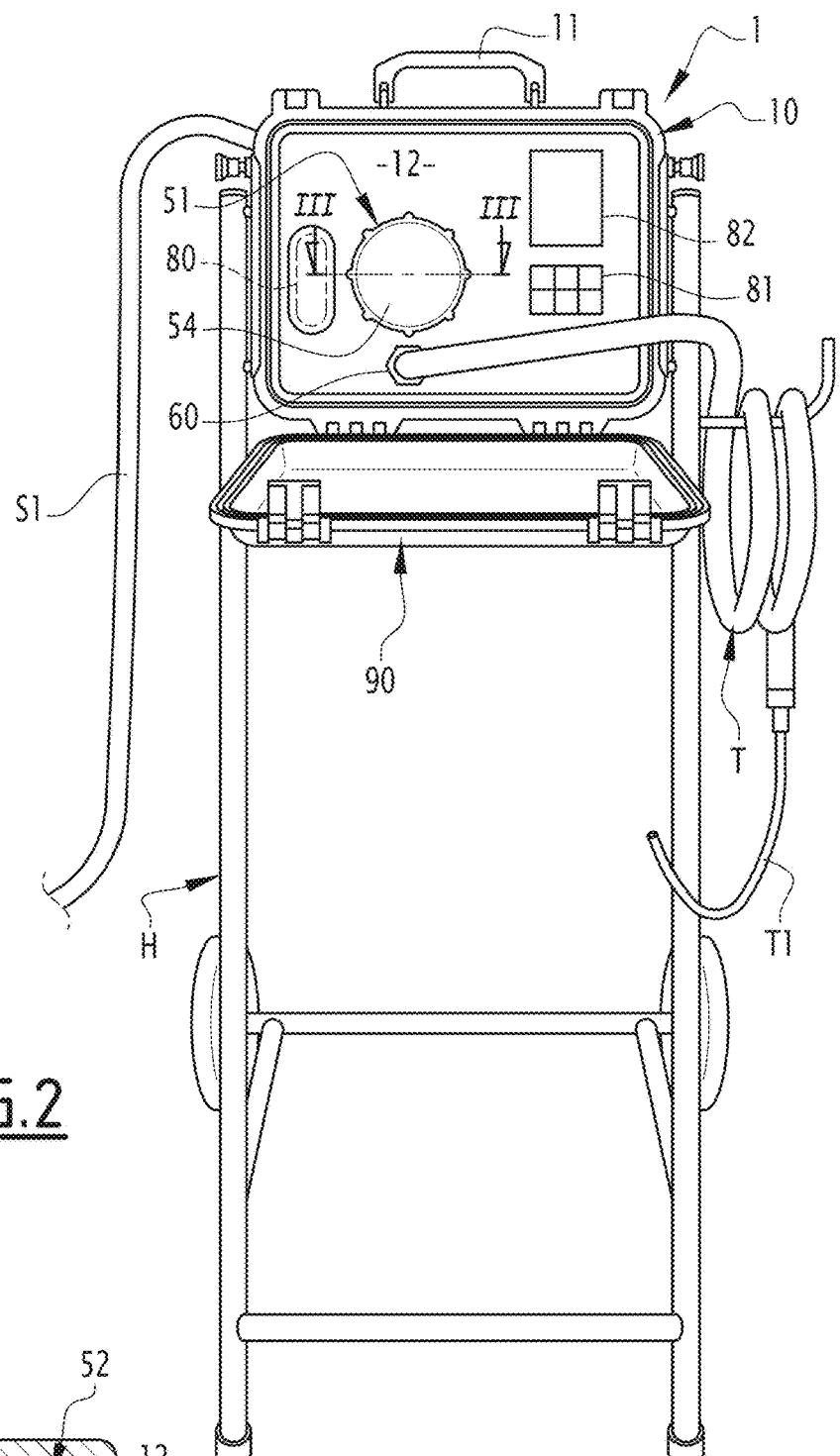
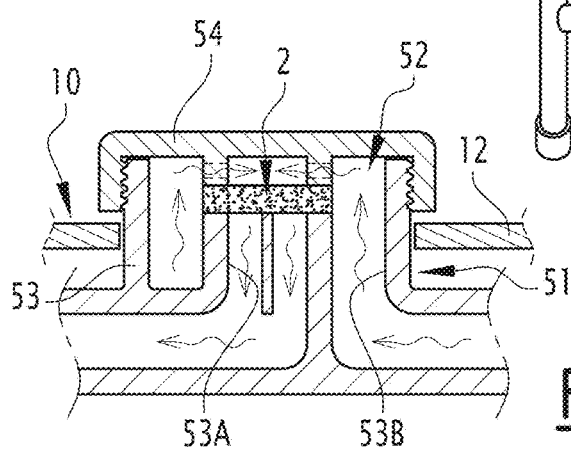

PORTABLE AIR SAMPLING APPARATUS AND AIR SAMPLING INSTALLATION COMPRISING SUCH AN APPARATUS

BACKGROUND OF THE INVENTION

Field of the Invention

The present invention relates to a portable air sampling apparatus. It also relates to an air sampling installation, comprising such an apparatus.

The invention examines the issue of inspecting goods and/or people, in particular during investigation or customs actions, with the aim of detecting the presence of illegal materials, in particular explosives and narcotics.

Description of the Related Art

For example to secure international cargo transported by plane, it is known to sample the air contained in a substantially confined volume in which a lot of cargo to be inspected is confined. This sampled air is filtered, i.e., passed through an ad hoc substrate, so as to capture odorous molecules on the substrate coming from target materials that may be present in the confined volume. The substrate for collecting odorous molecules is next analyzed, in particular by having it smelled by a dog trained for the olfactory detection of the smell of the target materials, as explained in detail in FR 2,956,211. Of course, in order for the analysis to be reliable, in particular in order for the dog to effectively be able to detect the smell of the targeted odorous particles, it is essential for a minimum quantity of these odorous particles to be collected during the air sampling from the substantially confined volume in which the cargo to be inspected is located. In practice, the sampled air is suctioned by an appropriate apparatus that circulates the suctioned air through the aforementioned substrate: in order for the sampling to be reliable, the operation must be done according to the rules of the art, in particular during a minimum duration. As a result, the reliability of the inspection is based on the vigilance of the operator responsible for the suction operation, with a risk inherent to this type of human intervention.

SUMMARY OF THE INVENTION

The aim of the present invention is to propose an air sampling apparatus, which, while being particularly practical and easy to use, makes it possible to perform more reliable inspections.

To that end, the invention relates to a portable air sampling apparatus, including:
  a Venturi pump, which comprises both an air flow channel, connecting a supply mouth and a discharge mouth of the Venturi pump, and a suction inlet emerging in the airflow channel between the supply mouth and discharge mouth, the Venturi pump being suitable for creating a vacuum in the suction inlet when compressed air circulates in the airflow channel from the supply mouth to the discharge mouth,
  a supply line provided to supply the Venturi pump with compressed air, the supply line being connected to the supply mouth and being provided with an electrovalve that controls circulation of compressed air in the supply line,
  a suction line provided to suction an air sample, the suction line being connected to the suction inlet and being provided with an air circulation member, the air circulation member delimiting a chamber which removably receives a substrate for capturing odorous molecules associated with a target material, and the air circulation member being suitable for circulating the suctioned air sample through the substrate received in the chamber, and
  an electronic unit, connected to the electrovalve and suitable for controlling the opening and closing of the electrovalve such that:
    when the electrovalve is open, compressed air circulates in the supply line through the electrovalve, and
    when the electrovalve is closed, the circulation of compressed air in the supply line, between upstream and downstream of the electrovalve, is interrupted by the electrovalve.

Thus, the apparatus according to the invention incorporates an electronic unit that makes it possible to automate at least part of the air sampling and therefore to limit some lacks of reliability resulting from incorrect manipulations by a human operator. Indeed, the electronic unit controls an electrovalve that acts on the compressed air circulation sent to a Venturi pump of the apparatus: when the electrovalve is open, compressed air, supplied by an available outside source, circulates through the Venturi pump and causes the creation of a vacuum to suction the air to be sampled; when the electrovalve is closed, the air circulation is interrupted and therefore the suction ceases. Then, by programming the electronic unit appropriately, the suction operation, in particular its duration or its intensity, can be controlled reliably, at least more reliably than if this operation were to be performed exclusively by a human operator. Programming examples are outlined hereinafter. Furthermore, the apparatus according to the invention remains very practical to use, since it is portable and can require only a supply of compressed air to operate, the power supply of the electronic unit advantageously being able to be provided by a battery, rechargeable and/or interchangeable, on board the apparatus. Additionally, the presence of the electronic unit advantageously makes it possible to incorporate monitoring and safety functions into the suction operation, as outlined hereinafter. Furthermore, the apparatus according to the invention can advantageously have various specific developments, in particular to strengthen its performance, its lifetime and its ergonomics.

According to additional advantageous features of the apparatus according to the invention:
  The supply line is also provided with a first pressure probe, which is suitable for measuring the relative pressure in the supply line upstream from the electrovalve and for sending a corresponding measuring signal to the electronic unit, the electronic unit being configured to compare the absolute value of the relative pressure measured by the first pressure probe to a first threshold.
  The electronic unit is configured to close the electrovalve when the absolute value of the pressure measured by the first pressure probe is below the first threshold.
  The air circulation member is provided with a second pressure probe, which is suitable for measuring the relative pressure in the chamber and for sending a corresponding measuring signal to the electronic unit, the electronic unit being configured to compare the absolute value of the relative pressure measured by the second pressure probe to a second threshold.

The electronic unit is configured to close the electrovalve when the absolute value of the relative pressure measured by the second pressure probe is below the second threshold.

The suction line is also provided with a third pressure probe, which is suitable for measuring the relative pressure in the suction line upstream from the air circulation member and for sending a corresponding measuring signal to the electronic unit, the electronic unit being configured to compare the absolute value of the relative pressure measured by the third pressure probe to a third threshold.

The electronic unit is configured to close the electrovalve when the absolute value of the relative pressure measured by the third pressure probe is above the third threshold.

The electronic unit is configured to:
open the electrovalve when the electronic unit receives a startup instruction from a user, then
close the electrovalve after a predetermined duration that is counted down by the electronic unit.

The suction line is also provided with a flow meter, which is suitable for measuring a flow rate in the suction line and sending a corresponding measuring signal to the electronic unit, and wherein the electronic unit is configured to:
open the electrovalve when the electronic unit receives a startup instruction from a user, then
close the electrovalve once a quantity of air, calculated by the electronic unit from the flow rate measured by the flow meter, reaches a predetermined value.

The air circulation member includes:
a body that comprises a central channel and a peripheral channel that at least partially surrounds the central channel, each of the central channel and the peripheral channel emerging in the chamber, and
a cover that is suitable for being removably attached on the body so as to close the chamber and to keep in place, between the body and the cover, the substrate received in the chamber, such that air suctioned in the suction line circulates successively in one of the central channel and the peripheral channel, through the substrate received in the chamber, and in the other of the central channel and the peripheral channel, before rejoining the suction inlet.

The opening and closing of the electrovalve are controlled electrically, the electrovalve being closed in the absence of electrical power while the electrovalve opens when supplied with power.

The apparatus further includes a battery, rechargeable and/or interchangeable, provided to supply electricity to the electronic unit.

The apparatus further includes a shell in which are arranged the Venturi pump, the supply line, the suction line and the electronic unit, the shell bearing both a first coupling, provided to connect the supply line to a compressed air source, and a second coupling, provided to connect the suction line to a suction hose.

The apparatus further includes a hood that is mounted movably on the shell between a closed position, in which the hood covers a face of the shell while prohibiting access to the second coupling, the chamber and a manual control interface, connected to the electronic unit, and an open position, in which the hood is separated from said face of the shell so as to allow access to the second coupling, the chamber and the manual control interface.

The invention also relates to an air sampling installation, including:
an apparatus as defined above,
a compressed air source connected to an upstream end of the supply line of the apparatus, and
a suction hose, one of the ends of which is connected to an upstream end of the suction line of the apparatus and the other end of which is suitable for being inserted into a substantially confined volume of air in which at least one target material may be located.

The invention also relates to an air sampling installation, including:
a compressed air source,
an apparatus as defined above, whereof the first coupling is connected to the compressed air source,
a suction hose, one of the two ends of which is engaged with the second coupling of the apparatus and the other end of which is suitable for being inserted into a substantially confined volume of air in which at least one target material may be located, and
a trolley suitable for fixedly supporting the shell of the apparatus and for keeping substantially horizontal the hood in the open position.

BRIEF DESCRIPTION OF THE DRAWINGS

The invention will be better understood upon reading the following description, provided solely as an example and done in reference to the drawings, in which:

FIG. 2 is a perspective view of an exemplary air sampling installation according to the invention, including the apparatus of FIG. 1; and FIG. 3 is a partial schematic sectional view along line III-III of FIG. 2.

DESCRIPTION OF THE PREFERRED EMBODIMENTS

Figure 1:
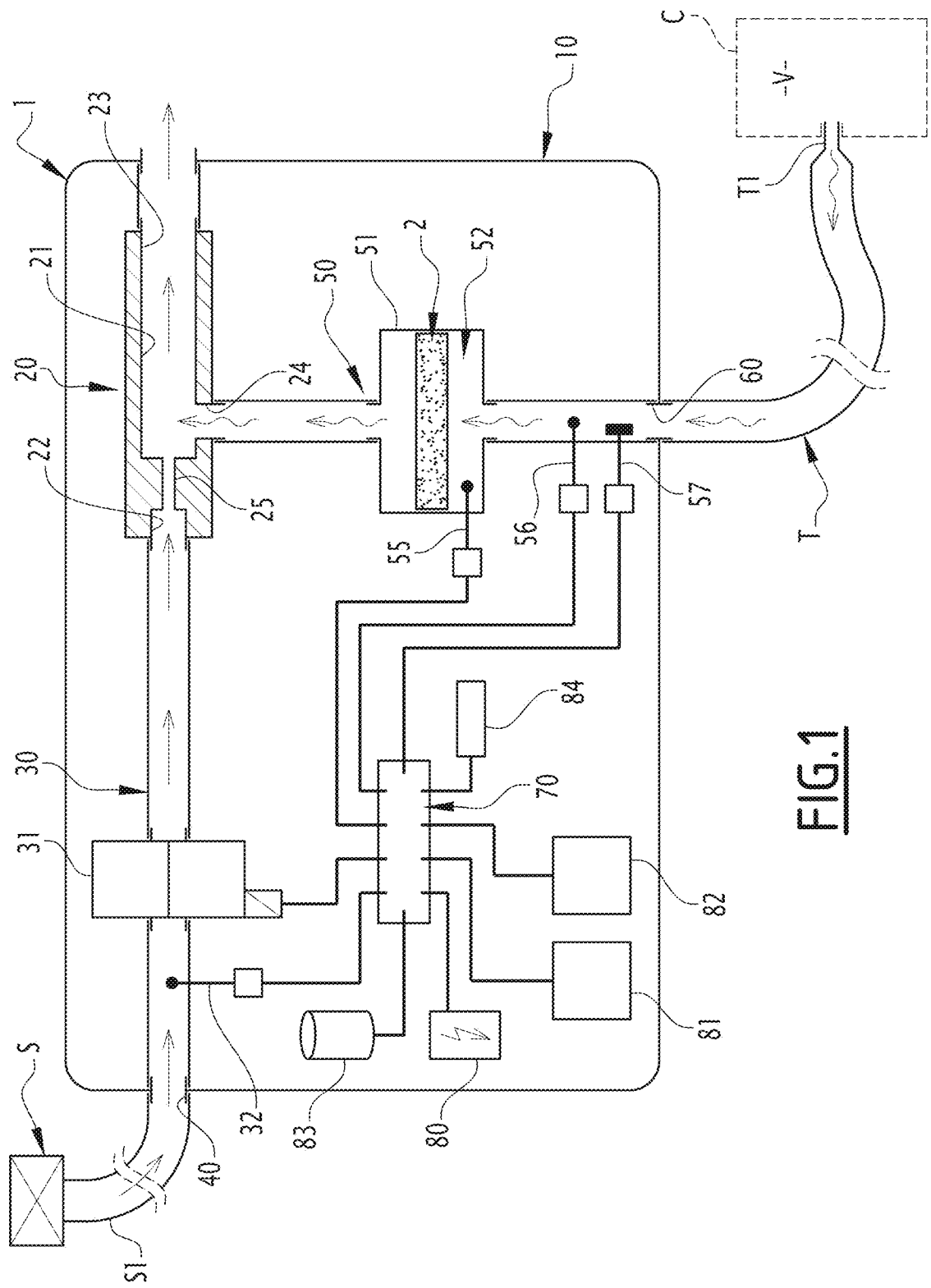
FIG. 1 is a schematic view of an exemplary embodiment of an apparatus according to the invention, during use to perform an air sampling.

FIGS. 1 to 3 show an apparatus 1 making it possible to sample air contained in a substantially confined volume V and to capture, on a substrate 2, airborne odorous molecules, which may be present in the sampled air.

In practice, the substantially confined volume of air V is delimited by a container C inside which cargo and/or people are located, for example having to access or leave a secure zone, such as an airport or port zone. The target material may be found in this volume of air V, while for example being hidden in the aforementioned cargo and/or on the aforementioned people: if this target material is in fact present inside the container C, it releases characteristic odorous molecules therein which, due to their lightness, can be in suspension inside the container C, in other words in the volume of air V. By way of non-limiting examples, the target material can be an explosive material, such as plastic, dynamite, TNT, etc., or a narcotic material, such as heroin, cocaine, cannabis, etc. Likewise, the embodiment of the container C is not limiting: this container C can be a trailer, sheet metal- and/or tarp-covered container, a truck, or a film-covered cargo pallet, or a sheet metal- and/or tarp-covered container, or a box, or a motor vehicle, or a part of a building.

Furthermore, the embodiment of the substrate 2 for capturing airborne odorous molecules is also not limiting, once this substrate 2 includes a substrate sensitive and reactive to the targeted airborne odorous molecules, in that, in contact with such molecules, the aforementioned material reversibly captures them, via a physical, chemical or physicochemical reaction. By way of non-limiting example, the aforementioned material consists of short polyester or polypropylene fibers.

The apparatus 1 includes a shell 10 supporting all of the other components of the apparatus. In FIG. 1, the shell 10 is drawn schematically as outer contour of the apparatus 1. In FIG. 2, the shell 10 assumes the form of a housing, for example globally parallelepiped. Irrespective of the embodiment of the shell 10, the latter is advantageously provided with a handle 11 or a similar gripping member, which allows a user to hold and transport the apparatus 1 by hand, in particular when this apparatus is not yet operating. More generally, the apparatus 1 is provided to be portable, in particular owing to its shell 10.

The apparatus 1 also includes a Venturi pump 20, also called Venturi vacuum pump or Venturi effect vacuum pump, arranged inside the shell 10. The Venturi pump 20 makes it possible to generate a vacuum, and thus suction, when it is passed through by a flow of compressed air. To that end, as shown schematically in FIG. 1, the Venturi pump 20 comprises an air flow channel 21, which connects a supply mouth 22 and a discharge mouth 23 of the Venturi pump 20. Furthermore, the Venturi pump 20 comprises a suction inlet 24 that emerges in the flow channel 21 between the supply 22 and discharge 23 mouths, immediately downstream from a throat 25 of the flow channel: when compressed air circulates in the flow channel 21 from the supply mouth 22 toward the discharge mouth 23, as indicated by the straight arrows in FIG. 1, the compressed air accelerates while passing through the throat 25 and, just downstream from the latter, creates a vacuum in the suction inlet 24, the air present in the suction inlet 24 then being suctioned in the air flow channel 21 toward the discharge mouth 23, while being mixed with the compressed air flow. The Venturi effect that has just been described is well known in the art, such that the Venturi pump 20 as such will not be described in more detail, with the understanding that the embodiment specificities of this Venturi pump are not limiting.

In order to supply the Venturi pump 20 with compressed air, the apparatus 1 includes a supply line 30, arranged inside the shell 10. As shown schematically in FIG. 1, this supply line 30 is, at its downstream end, connected to the supply mouth 22 of the Venturi pump 20 and is, at its upstream end, connected to a coupling 40 emerging partially outside the shell 10. The coupling 40 makes it possible to connect, outside the shell 10, the supply line 30 to a compressed air source S, which is separate from and outside the apparatus 1 and which is for example a compressed air network, connected to the apparatus 1 by a pressurized pipe S1 shown in FIGS. 1 and 2.

As indicated schematically in FIG. 1, the supply line 30 incorporates an electrovalve 31 controlling the circulation of compressed air in the supply line 30: when the electrovalve 31 is open, compressed air supplying the coupling 40 circulates in the supply line 30 through the electrovalve 31 up to the supply mouth 22 of the Venturi pump 20, as indicated by the straight arrows in FIG. 1; when the electrovalve 31 is closed, the circulation of compressed air in the supply line 30, between the upstream and downstream directions of the electrovalve 31, is interrupted by the electrovalve. The opening and closing of the electrovalve 31 are controlled electrically. According to one advantageous practical arrangement, the electrovalve 31 is normally closed, i.e., it is closed in the absence of the electrical power supply and it opens when it is powered.

In the example embodiment considered here, the power supply line 30 is also provided with a pressure probe 32 making it possible to measure the relative pressure in the supply line 30 upstream from the electrovalve 31.

In order to suction an air sample coming from the substantially confined volume V, the apparatus 1 includes a suction line 50 arranged inside the shell 10. As shown schematically in FIG. 1, this supply line 50 is, at its downstream end, connected to the suction inlet 24 of the Venturi pump 21 and is, at its upstream end, connected to a coupling 60 emerging partially outside the shell 10. In the example embodiment considered in FIG. 2, the coupling 60 is arranged through a face 12 of the shell 10. The coupling 60 makes it possible to connect, outside the shell 10, the suction line 50 to a suction hose T that, in practice, is flexible and has a significant length, for example several meters. As shown in FIGS. 1 and 2, the suction hose T is provided, at its end opposite that engaged with the coupling 60, with the cannula Tl, having a smaller inner diameter than the suction hose T and provided to be inserted through a wall of the container C, to emerge in the substantially confined volume V.

As shown schematically in FIG. 1, the suction line 50 incorporates an air circulation member 51 that inwardly delimits a chamber 52 designed to receive the substrate 2 removably. The developments of the air circulation member 51 and the chamber 52, which make it possible to house the substrate 2 therein, then to remove it therefrom, are not limiting inasmuch as, when air is suctioned in the suction line 50 as indicated by the wavy arrows in FIG. 1, this suctioned air is forced to circulate through the substrate 2 received in the chamber 52.

According to one preferred embodiment, which is implemented in the example of FIGS. 2 and 3, the air circulation member 51 includes a body 53 and a removable cover 54, which jointly delimits the chamber 52. More specifically, as shown schematically in FIG. 3, the body 53 comprises a central channel 53A and a peripheral channel 53B at least partially surrounding the central channel 53A, these channels 53A and 53B for example being delimited by two coaxial tubular walls of the air circulation member 51. The channels 53A and 53B emerge, each and separately, in the chamber 52, which, opposite the mouth of the channels 53A and 53B, is closed by the cover 54 when the latter is fastened on the body 53. In order to access the chamber 52 and place, then remove the substrate 2 there, the cover 54 is attached removably on the body 53, by for example being screwed on the outer tubular wall of the body 53, having noted that, in the example embodiment considered here, this outer tubular wall is arranged through the face 12 of the shell 10. In all cases, when the cover 54 is fastened on the body 53 and the substrate 2 is received in the chamber 52, the substrate 2 is kept in place between the body 53 and the cover 54 such that, as indicated by the wavy arrows in FIG. 3, the air suctioned in the suction line 50 circulates successively in the peripheral channel 53B, through the substrate 2 received in the chamber 52, and in the central channel 53A, before rejoining the suction inlet 24 of the Venturi pump 20. In a variant that is not shown, the circulation of the air suctioned in the suction line 50 could be reversed at the air circulation member 51, i.e., this suctioned air can circulate successively in the central channel 53A, through the substrate 2 received in the chamber 52, and in the peripheral channel 53B, before rejoining the suction inlet 24. In both cases, the suctioned air is effectively channeled immediately upstream and immediately downstream from the substrate 2, such that this air is distributed over most if not all of the expanse of the substrate 2, while limiting the risks of part of the suctioned air being able to pass between the channels 53A and 53B while bypassing the substrate 2.

Irrespective of the embodiment of the air circulation member 51, the latter is, in the example considered in FIG. 1, provided with a pressure probe 55 making it possible to measure the relative pressure in the chamber 52.

Also in the exemplary embodiment considered in FIG. 1, the suction line 50 is provided, in addition to the pressure probe 55 inside the air circulation member 51, with a pressure probe 56 that makes it possible to measure the relative pressure in the suction line 50 upstream from the air circulation member 51.

Also in the exemplary embodiment of FIG. 1, the suction line 50 is also provided with a flow meter 57 making it possible to measure the flow rate in the suction line 50. The flow meter 57 is for example a thermal flow meter.

As shown schematically in FIG. 1, the apparatus 1 also includes an electronic unit 70, which is arranged inside the shell 10 and which, in practice, incorporates one or several microprocessors, as well as associated electronic components. This electronic unit 70 is connected, in particular by a wired connection, to the electrovalve 31, the pressure probes 32, 55 and 56, and the flow meter 57: the corresponding links make it possible to transmit electrical signals between the electronic unit 70 and the corresponding components, while allowing the electrical power supply of the latter, having noted that the electronic unit 70 is in turn supplied with electricity by any appropriate means. In the exemplary embodiment considered here, the apparatus 1 to that end includes a battery 80 making it possible to supply electricity to the electronic unit 70: this battery 80 is rechargeable and/or interchangeable, the access to the battery for recharging and/or replacement purposes advantageously being provided through the face 12 of the shell 10, as indicated in dotted lines in FIG. 2.

Furthermore, in the exemplary embodiment considered here and for reasons that will appear later, the electronic unit 70 is connected to other electrical or electronic components, namely a manual control interface 81 and a display interface 82, which, as shown in FIG. 2, are advantageously arranged through the face 12 of the shell 10.

In all cases, the electronic unit 70 makes it possible to control the opening and the closing of the electrovalve 31, subject to the corresponding electrical signals supplied to the electrovalve by the electronic unit. In practice, several configuration or programming possibilities of the electronic unit 70 can be considered to operate the apparatus 1.

According to a first possibility, the electronic unit 70 is configured to open the electrovalve 31 when the electronic unit receives a startup instruction from a user, typically given through the manual control interface 81. Once the electronic unit 70 has controlled the opening of the electrovalve 31, the electronic unit counts down a predetermined duration, at the end of which the electronic unit controls the closing of the electrovalve 31. In practice, the aforementioned predetermined duration is preprogrammed, while for example being stored in a memory 83 of the apparatus 1. If applicable, the aforementioned predetermined duration is chosen by the user, while for example being selected in a list of several possible values, stored in the memory 83 and proposed to the user via the display interface 82, one of them being validated by the user using the manual control interface 81. In a variant, the aforementioned predetermined duration can be entered by the user, via the interfaces 81 and 82. In practice, it is understood that the value of the aforementioned predetermined duration is related, inter alia, to the size of the substantially confined volume V.

According to another programming or configuration possibility, the electronic unit 70 is configured, after having opened the electrovalve 31 upon receiving a startup instruction from a user, not to close the electrovalve after predetermined duration, but to close the electrovalve once a quantity of air, calculated by the electronic unit 70, reaches a predetermined value that is preprogrammed, while for example being stored in the memory 83. The quantity of air calculated by the electronic unit 70 is determined from the flow rate of air suctioned in the suction line 50, measured by the flow meter 57.

Other programming or configuration possibilities of the electronic unit 70 can be considered, so that this electronic unit controls the opening, then the closing of the electrovalve 31 so as to sample air under predetermined conditions.

According to one advantageous optional aspect, the electronic unit 70 makes it possible to monitor the sampling of air done by the apparatus 1 in order to secure the obtained result. To that end, when the apparatus 1 is commissioned, in particular when the electrovalve 31 is opened, the electronic unit 70 is configured to compare the absolute value of the relative pressures respectively measured by the pressure probes 32, 55 and 56 to respective predetermined thresholds. Thus, the electronic unit 70 detects a malfunction:

when the absolute value of the relative pressure measured by the pressure probe 32 is below a first predetermined threshold, which corresponds to an insufficient supply of the supply line 30 with compressed air from the compressed air source S, or when the absolute value of the relative pressure measured by the pressure probe 55 is below a second predetermined threshold, which corresponds to an incorrect closing of the chamber 52, in particular to an incorrect fastening of the removable cover 54 on the body 53, or when the absolute value of the relative pressure measured by the pressure probe 56 is above a third predetermined threshold, which corresponds to an excess vacuum at the inlet of the suction line 50, typically due to the partial or total closure of the suction hose T.

Once the electronic unit 70 detects such a malfunction, an alert can for example be displayed on the display interface 82 to the user's attention. Furthermore, the electronic unit 70 can advantageously be configured to close the electrovalve 31 when such a malfunction appears, then interrupting the air sampling in progress.

According to another advantageous optional aspect, which is illustrated in FIG. 2, the apparatus 1 includes a hood 90 that is mounted movably, in particular tilting, on the shell 10 between closed and open positions, the hood 90 being shown in the open position in FIG. 2. In the closed position, the hood 90 covers and thus protects the face 12 of the shell 10, by prohibiting access to the components of the apparatus 1 arranged through this face 12. In particular, the hood 90 in the closed position prohibits access to the coupling 60, to the chamber 52 inside the air circulation member 51 and to the manual control interface 81: as long as the hood 90 is in the closed position, the apparatus 1 cannot be commissioned. When the hood 90 is in the open position, the hood is moved away from the face 12 of the shell 10 such that the user can access, inter alia, the coupling 60, the chamber 52 and the manual control interface 81.

Advantageously, the hood 90 in the open position can serve as a work surface for the user, in particular to deposit the cover 54 there when the latter is separated from the body 53, as well as to deposit a transport case of the substrate 2 there in which the latter is to be placed after having been removed from the chamber 52. In order for the apparatus 1 to be located at hand height for the user when the latter is standing, and thus to improve the ergonomics of the apparatus 1, the latter is advantageously associated with a trolley H, to which the shell 10 can be fastened for support purposes and which keeps the cover 90 substantially horizontal in the open position. This trolley H rests on the ground by feet and/or casters, making it easier to move, in particular in order to bring the container C closer to the apparatus 1 supported by the trolley H.

Lastly, various arrangements and variants of the apparatus 1 described thus far, as well as the installation to which the apparatus 1 belongs, can be considered. As an example, in order to exchange data and/or control instructions remotely between the apparatus 1 and a remote terminal, the apparatus 1 can incorporate a wireless communication module 84, connected to the electronic unit 70, as indicated schematically in FIG. 1.

The invention claimed is:

1. A portable air sampling apparatus, comprising:
   a Venturi pump, which comprises both an air flow channel, connecting a supply mouth and a discharge mouth of the Venturi pump, and a suction inlet emerging in the air flow channel between the supply mouth and discharge mouth, the Venturi pump being suitable for creating a vacuum in the suction inlet when compressed air circulates in the air flow channel from the supply mouth to the discharge mouth;
   a supply line provided to supply the Venturi pump with compressed air, the supply line being connected to the supply mouth and being provided with an electrovalve that controls circulation of compressed air in the supply line;
   a suction line provided to suction an air sample, the suction line being connected to the suction inlet and being provided with an air circulation member, the air circulation member delimiting a chamber which removably receives a substrate for capturing odorous molecules associated with a target material, and the air circulation member being suitable for circulating the suctioned air sample through the substrate received in the chamber; and
   an electronic unit, connected to the electrovalve and configured to control opening and closing of the electrovalve such that:
      when the electrovalve is open, compressed air circulates in the supply line through the electrovalve, and
      when the electrovalve is closed, the circulation of compressed air in the supply line, between upstream and downstream of the electrovalve, is interrupted by the electrovalve.

2. The apparatus according to claim 1, wherein the supply line is also provided with a pressure probe, configured to measure a relative pressure in the supply line upstream from the electrovalve and to send a corresponding measuring signal to the electronic unit, the electronic unit being configured to compare an absolute value of the relative pressure measured by the pressure probe to a threshold.

3. The apparatus according to claim 2, wherein the electronic unit is configured to close the electrovalve when the absolute value of the pressure measured by the pressure probe is below the threshold.

4. The apparatus according to claim 1, wherein the air circulation member is provided with a pressure probe, configured to measure a relative pressure in the chamber and to send a corresponding measuring signal to the electronic unit, the electronic unit being configured to compare an absolute value of the relative pressure measured by the pressure probe to a threshold.

5. The apparatus according to claim 4, wherein the electronic unit is configured to close the electrovalve when the absolute value of the relative pressure measured by the pressure probe is below the threshold.

6. The apparatus according to claim 1, wherein the suction line is also provided with a pressure probe, configured to measure a relative pressure in the suction line upstream from the air circulation member and to send a corresponding measuring signal to the electronic unit, the electronic unit being configured to compare an absolute value of the relative pressure measured by the pressure probe to a threshold.

7. The apparatus according to claim 6, wherein the electronic unit is configured to close the electrovalve when the absolute value of the relative pressure measured by the pressure probe is above the threshold.

8. The apparatus according to claim 1, wherein the electronic unit is configured to:
   open the electrovalve when the electronic unit receives a startup instruction from a user, then
   close the electrovalve after a predetermined duration that is counted down by the electronic unit.

9. The apparatus according to claim 1,
   wherein the suction line is also provided with a flow meter, configured to measure a flow rate in the suction line and to send a corresponding measuring signal to the electronic unit, and
   wherein the electronic unit is configured to:
      open the electrovalve when the electronic unit receives a startup instruction from a user, then
      close the electrovalve once a quantity of air, calculated by the electronic unit from the flow rate measured by the flow meter, reaches a predetermined value.

10. The apparatus according to claim 1, wherein the air circulation member includes:
    a body that comprises a central channel and a peripheral channel that at least partially surrounds the central channel, each of the central channel and the peripheral channel emerging in the chamber, and
    a cover that is removably attached on the body so as to close the chamber and to keep in place, between the body and the cover, the substrate received in the chamber, such that air suctioned in the suction line circulates successively in a first of the central channel and the peripheral channel, through the substrate received in the chamber, and in a second of the central channel and the peripheral channel, before rejoining the suction inlet.

11. The apparatus according to claim 1, wherein the opening and closing of the electrovalve are controlled electrically, the electrovalve being closed in an absence of electrical power while the electrovalve opens when supplied with power.

12. The apparatus according to claim 1, further comprising:
    a battery, rechargeable and/or interchangeable, configured to supply electricity to the electronic unit.

13. The apparatus according to claim 1, further comprising:
    a shell, in which are arranged the Venturi pump, the supply line, the suction line and the electronic unit, the shell bearing both a first coupling, configured to connect the supply line to a compressed air source, and a second coupling, configured to connect the suction line to a hose.

14. The apparatus according to claim 13, further comprising:
a hood that is mounted movably on the shell between:
   a closed position, in which the hood covers a face of the shell so as to prohibit access to all of the second coupling, the chamber, and a manual control interface, said manual control interface being connected to the electronic unit, and
   an open position, in which the hood is separated from said face of the shell so as to allow access to all of the second coupling, the chamber, and the manual control interface.

15. An air sampling installation, comprising:
a compressed air source;
an apparatus that is according to claim 14, and whereof the first coupling is connected to the compressed air source;
a suction hose, a first end of the suction hose engaged with the second coupling of the apparatus and a second end of the suction hose configured to be inserted into a substantially confined volume of air in which at least one target material may be located; and
a trolley, configured to fixedly support the shell of the apparatus and to keep substantially horizontal the hood in the open position.

16. An air sampling installation, comprising:
an apparatus according to claim 1;
a compressed air source connected to an upstream end of the supply line of the apparatus; and
a suction hose, a first end of the suction hose connected to an upstream end of the suction line of the apparatus and a second end of the suction hose configured to be inserted into a substantially confined volume of air in which at least one target material may be located.

* * * * *